United States Patent
Fujimori et al.

(10) Patent No.: US 10,629,065 B2
(45) Date of Patent: Apr. 21, 2020

(54) WIRELESS SENSOR TERMINAL, WIRELESS SENSOR SYSTEM, AND SENSOR DATA COLLECTION METHOD

(71) Applicant: Hitachi, Ltd., Tokyo (JP)

(72) Inventors: Tsukasa Fujimori, Tokyo (JP); Akira Kuriyama, Tokyo (JP); Toshihiko Fukamachi, Tokyo (JP); Takashi Oshima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 16/067,154

(22) PCT Filed: Feb. 22, 2017

(86) PCT No.: PCT/JP2017/006589
§ 371 (c)(1),
(2) Date: Jun. 29, 2018

(87) PCT Pub. No.: WO2018/003166
PCT Pub. Date: Jan. 4, 2018

(65) Prior Publication Data
US 2019/0005807 A1 Jan. 3, 2019

(30) Foreign Application Priority Data
Jun. 27, 2016 (JP) .................................. 2016-126557

(51) Int. Cl.
*G08C 15/06* (2006.01)
*G08C 17/02* (2006.01)
(Continued)

(52) U.S. Cl.
CPC ............. *G08C 15/06* (2013.01); *G08C 15/00* (2013.01); *G08C 17/00* (2013.01); *G08C 17/02* (2013.01);
(Continued)

(58) Field of Classification Search
CPC ........ G08C 15/06; G08C 15/00; G08C 17/00; G08C 17/02; H04M 11/00; H04Q 9/00;
(Continued)

(56) References Cited

U.S. PATENT DOCUMENTS

2003/0130810 A1* 7/2003 Smulders ............... G01H 1/003
702/56
2015/0257203 A1* 9/2015 Okada .................... G08C 15/00
370/338

FOREIGN PATENT DOCUMENTS

JP 2002-010983 A 1/2002
JP 2007-241583 A 9/2007
(Continued)

OTHER PUBLICATIONS

International Search Report of PCT/JP2017/006589 dated May 23, 2017.

*Primary Examiner* — Amine Benlagsir
(74) *Attorney, Agent, or Firm* — Mattingly & Malur, PC (57) ABSTRACT

Provided is a wireless sensor node which includes a sensor to convert a physical quantity into an electric signal to measure the physical quantity, a filter to extract a signal containing a predetermined frequency from the electric signal, a transmitter to transmit data based on the frequency extracted by the filter, a receiver to receive a command to be transmitted from an outside in a wireless manner, and a control unit to control a frequency to be extracted by the filter based on the command.

11 Claims, 5 Drawing Sheets

(51) Int. Cl.

| | |
|---|---|
| *H04M 11/00* | (2006.01) |
| *G08C 15/00* | (2006.01) |
| *H04Q 9/00* | (2006.01) |
| *G08C 17/00* | (2006.01) |
| *H04Q 9/02* | (2006.01) |
| *H04W 88/18* | (2009.01) |

(52) U.S. Cl.
CPC .............. *H04M 11/00* (2013.01); *H04Q 9/00* (2013.01); *H04Q 9/02* (2013.01); *H04Q 2209/40* (2013.01); *H04Q 2209/88* (2013.01); *H04W 88/18* (2013.01)

(58) Field of Classification Search
CPC .. H04Q 9/02; H04Q 2209/40; H04Q 2209/88; H04W 88/18
See application file for complete search history.

(56) References Cited

FOREIGN PATENT DOCUMENTS

| | | |
|---|---|---|
| JP | 2014-081860 A | 5/2014 |
| JP | 2016-038275 A | 3/2016 |
| WO | 2013/190973 A1 | 12/2013 |

\* cited by examiner

WIRELESS SENSOR TERMINAL, WIRELESS SENSOR SYSTEM, AND SENSOR DATA COLLECTION METHOD

TECHNICAL FIELD

The present invention relates to a sensor network system.

BACKGROUND ART

As a related art in this technical field, JP-A-2014-81860 (PTL 1) is disclosed. A sensor network system according to the related art discloses a method of reducing power consumption required for a wireless communication of a sensor terminal which collects environmental information, and operating the sensor terminal using an independent power source.

CITATION LIST

Patent Literature

PTL 1: JP-A-2014-81860

SUMMARY OF INVENTION

Technical Problem

In PTL 1, the power consumption of the wireless communication is reduced by reducing power consumption to an extent such that a wireless sensor node is operatable using the independent power source. Therefore, in the method, a measurement result of the sensor is transmitted by a message as short as possible, and the data is accumulated time-sequentially.

However, only a short size of data is allowed to be transmitted to reduce a wireless communication volume, and the type of usable sensors such as temperature, humidity, and illuminance are limited to a physical quantity as much as data size of several bytes which can be measured at one time. Therefore, for example, the data size comes to be increased in a sensor which performs a number of times of measurement in a relatively short period of time such as the measurement of the vibration spectrum, and thus the sensor is not applicable.

Solution to Problem

According to an aspect of the invention to solve the problem, there is provided a wireless sensor node which includes a sensor which converts a physical quantity into an electric signal to measure the physical quantity, a filter which extracts a signal containing a predetermined frequency from the electric signal, a transmitter which transmits data in a wireless manner based on the signal containing the frequency extracted by the filter, a receiver which receives a command transmitted from an outside in a wireless manner, and a control unit which controls a frequency to be extracted by the filter based on the command.

According to another aspect of the invention, there is provided a wireless sensor system which includes a wireless sensor node, and a data collection/analysis device. Herein, the wireless sensor node includes a sensor which converts a physical quantity into an electric signal to measure the physical quantity, a filter which extracts a signal containing a predetermined frequency from the electric signal, a transmitter which transmits data to the data collection/analysis device in a wireless manner based on a signal containing the frequency extracted by the filter, a receiver which receives a command transmitted from the data collection/analysis device in a wireless manner, and a control unit which controls a frequency to be extracted by the filter based on the command.

According to still another aspect of the invention, there is provided a sensor data collecting method in a wireless sensor system which includes a wireless sensor node and a data collection/analysis device. In the method, the wireless sensor node includes a sensor which converts a physical quantity into an electric signal to measure the physical quantity, a filter which extracts a signal containing a predetermined frequency from the electric signal, a transmitter which transmits data to the data collection/analysis device in a wireless manner based on a signal containing the frequency extracted by the filter, a receiver which receives a command transmitted from the data collection/analysis device in a wireless manner, and a control unit which controls a frequency to be extracted by the filter based on the command. Then, in an initial mode, the wireless sensor node performs a first step of transmitting data in a wireless manner based on a signal containing all frequency band to the data collection/analysis device without filtering the electric signal obtained by the sensor using the filter, a second step of receiving a command which is transmitted from the data collection/analysis device in a wireless manner, and a third step of moving to a steady mode by controlling a frequency to be extracted by the filter based on the command. In addition, in the steady mode, the wireless sensor node performs a fourth step of transmitting data in a wireless manner based on a signal containing a frequency limited by filtering the electric signal obtained by the sensor using the filter to the data collection/analysis device. Then, a wireless transmission frequency in the first step is controlled smaller than a wireless transmission frequency in the fourth step.

Advantageous Effects of Invention

According to the invention, it is possible to reduce power consumption at the wireless sensor node in a case where a sensor is used to perform a number of times of measurement in a relatively short period of time.

DESCRIPTION OF EMBODIMENTS

Hereinafter, embodiments will be described in detail using the drawings. However, the content of the embodiments described below is not interpreted in a way of limiting the invention. A person skilled in the art can easily understand that the specific configuration may vary in a scope not departing from the idea and the spirit of the invention.

Portions having the same or similar functions in the configuration of the invent ion described below will be attached with the same symbol and commonly used in different drawings, and the redundant description will be omitted.

Positions, sizes, shapes, and ranges of the respective configurations illustrated in the drawings may be not exactly the same as the actual positions, sizes, shapes, and ranges in order to help with understanding on the invention. Therefore, the invention is not necessarily limited to the positions, sizes, shapes, and ranges disclosed in the drawings.

The notations "first", "second", and "third" in this specification are assigned in order to identify the components, and do not necessarily indicate a limited quantity or sequence. In addition, symbols for identifying the components are used according to contexts. A symbol used in one context does not necessarily show the same configuration in another context. In addition, a component identified with a symbol may be used as a function of a component identified with another symbol.

Making an explanation on the outline of an embodiment, a filter circuit is provided in a wireless sensor node. The filter circuit extracts only a specific frequency out of a sensor and an analog signal from the sensor. Further, there is provided an integral strength acquisition circuit, as needed, which acquires strength of a signal output from the filter circuit by integrating the signal for a certain period of time. In addition, there is provided an analog-digital conversion circuit which converts the output from the integral strength acquisition circuit into digital data. Further, a pass band of the filter circuit and an integral period of the integral strength acquisition circuit may be configured using a variable value which is set from the outside of the wireless sensor node.

<1. System Configuration>

Figure 1:
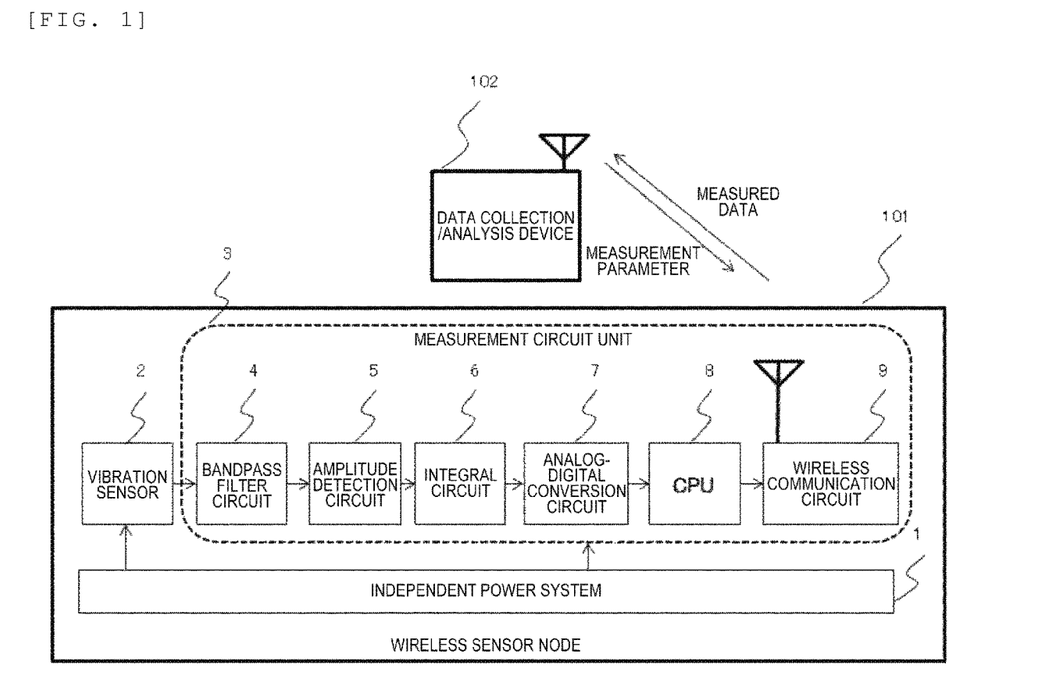
FIG. 1 is a block diagram illustrating a configuration of an example of a sensing system.

FIG. 1 is a diagram illustrating an exemplary configuration of a sensing system of the embodiment. A wireless sensor node 101 is a terminal which includes an independent power system 1, and operates a vibration sensor 2 and a measurement circuit unit 3 using power generated by the independent power system so as to realize a sensor function. The sensor function is to measure various physical quantities of the surroundings, and transmits the measured result to a data collection/analysis device 102 in a wireless manner. The "measurement" herein means a whole process of preparing data to be transmitted at a time by the wireless sensor node 101. In this embodiment, the description will be given about an example in which the surrounding vibration is measured by the vibration sensor 2, and the result is transmitted. In addition, the sensing system may be configured such that a plurality of wireless sensor nodes 101 are provided with respect one data collection/analysis device 102. For the sake of simplicity in the description below, the description will be given about only one of the wireless sensor nodes 101, but the same operation can be performed on the plurality of nodes.

It may difficult to secure a line for supplying power to the wireless sensor node 101 in many cases. Therefore, the independent power system 1 is configured by a power generation element such as a solar battery, a piezo element, and a Peltier element, an element such as a battery which supplies and accumulates power, a power control circuit, and a rectifier circuit. The independent power system 1 is not supplied from the outside of the wireless sensor node 101, and can supply power to the vibration sensor 2 and the measurement circuit unit 3.

The vibration sensor 2 is an element which converts a vibration of a measurement target into an electric signal, and outputs a voltage corresponding to amplitude of the vibration. It is possible to use a sensor element which is generally used for measuring vibrations such as a piezoelectric vibration sensor and a MEMS acceleration sensor. In addition, a microphone may also be used to measure sonic waves which are generated along with the vibrations. A bandwidth of a measurement target vibration varies depending on a measurement target, and thus an appropriate sensor is selected. In this embodiment, there is used a sensor which measures a vibration of a bandwidth about 10 Hz to 100 kHz, and outputs a voltage proportional to amplitude of the vibration.

The measurement circuit unit 3 performs a shaping process on the output signal of the vibration sensor 2, converts the output signal into a digital value, and transmits the digital value to the data collection/analysis device 102 as measured data in a wireless manner. The measurement circuit unit 3 is configured by a bandpass filter circuit 4, an amplitude detection circuit 5, an integral circuit 6, an analog-digital conversion circuit 7, a CPU 8, and a wireless communication circuit 9.

The bandpass filter circuit 4 is configured to vary in bandpass band according to a control signal from the CPU 8. For example, a plurality of bandpass filters having different pass bands are arranged. A bandpass filter to be used is switched by a control signal from the CPU 8. In this embodiment, ten bandpass filters having different pass bands are switched by 10 kHz unit such as 1 to 10 kHz and 10 to 20 kHz. Of course, the pass band may be changed by setting a circuit constant of the filter using the control signal from the CPU 8, or a digital filter circuit may be used. In addition, there is also a function of outputting the input itself from the vibration sensor 2 by the control from the CPU 8 without filtering.

The amplitude detection circuit 5 is a circuit which outputs a voltage proportional to an amplitude value of the signal output from the bandpass filter circuit 4. The amplitude detection circuit 5 may be realized using general circuits, for example, a signal level detection circuit, a rectifying circuit, and a maximum value detection circuit. In addition, there is also a function of outputting the input itself from the bandpass filter circuit 4 by the control from the CPU 8 without detecting an amplitude value. In addition, the amplitude detection circuit 5 may be omitted.

The integral circuit 6 is a circuit which integrates the input signal from the amplitude detection circuit 5 for a certain period of time, and outputs a voltage value proportional to the integrated value. There is also a function of controlling an integral period and of resetting an integral value using the control signal from the CPU 8. In addition, there is also a function of outputting the input itself from the amplitude detection circuit 5 by the control from the CPU 8 without integrating. In addition, the integral circuit 6 may be omitted.

The analog-digital conversion circuit 7 is a circuit which converts an input signal from the integral circuit 6 into a digital signal. As needed, an appropriate amplifying circuit may be inserted between the integral circuit 6 and the analog-digital conversion circuit 7 to amplify the analog signal. In addition, in a case where the amplitude detection circuit 5 and the integral circuit 6 are omitted, the output of the bandpass filter circuit 4 is received. Further, the analog-digital conversion circuit 7 may be configured to be included in the CPU 8. A sampling frequency of the analog-digital conversion is necessarily high to an extent that a spectrum analysis of the vibration is possible. In this embodiment, since the vibration sensor corresponds up to 100 kHz, the sampling is performed at 1 MHz.

The CPU 8 generates and outputs measured data which is transmitted to the data collection/analysis device through the wireless communication circuit 9, and receives a signal from the data collection/analysis device 102. In addition, the CPU 8 controls the operations of the blocks of the vibration sensor 2 and the measurement circuit unit 3 based on the received signal. The CPU 8 may be configured by hardware such as an FPGA (Field Programmable Gate Array) and an ASIC (Application Specific Integrated Circuit). In addition, the CPU 8 may be configured by a memory (not illustrated) to store data. The memory is, for example, a nonvolatile semiconductor memory. The process similar to the hardware may be realized in cooperation with other hardware by executing a program stored in the memory of a general purpose processor.

The wireless communication circuit 9 is a circuit which receives a signal from the CPU 8 in a wireless manner, and receives a signal from the data collection/analysis device in a wireless manner while a wireless frequency and a wireless manner are not particularly limited. For example, as a wireless manner generally used in the sensing system, there may be employed Wi-SUN (registered trademark), Zigbee (registered trademark), WiFi (registered trademark), WirelessHART (registered trademark), and Bluetooth (registered trademark). In addition, a unique protocol may be used in communication.

The data collection/analysis device 102 has a function of receiving and storing the measured data which is transmitted from the wireless sensor node 101. Further, there is a function of analyzing the stored measured data, and transmitting a measurement parameter to the wireless sensor node 101 based on the result in a wireless manner. The measurement parameter includes information for instructing settings of the respective circuits of the wireless sensor node 101. The measurement parameter may be considered as a command to the CPU. The information is, for example, a parameter such as circuit ON/OFF, filter frequency, and integral period. The data collection/analysis device 102 may be normally configured by adding a communication function to a computer which includes an input device, an output device, a memory device, and a processing device. Alternatively, the data collection/analysis device may be configured by dedicated hardware. In addition, the data collection/analysis device may be realized by a general personal computer equipped with a wireless communication function.

<2. Operation Flow>

Figure 2:
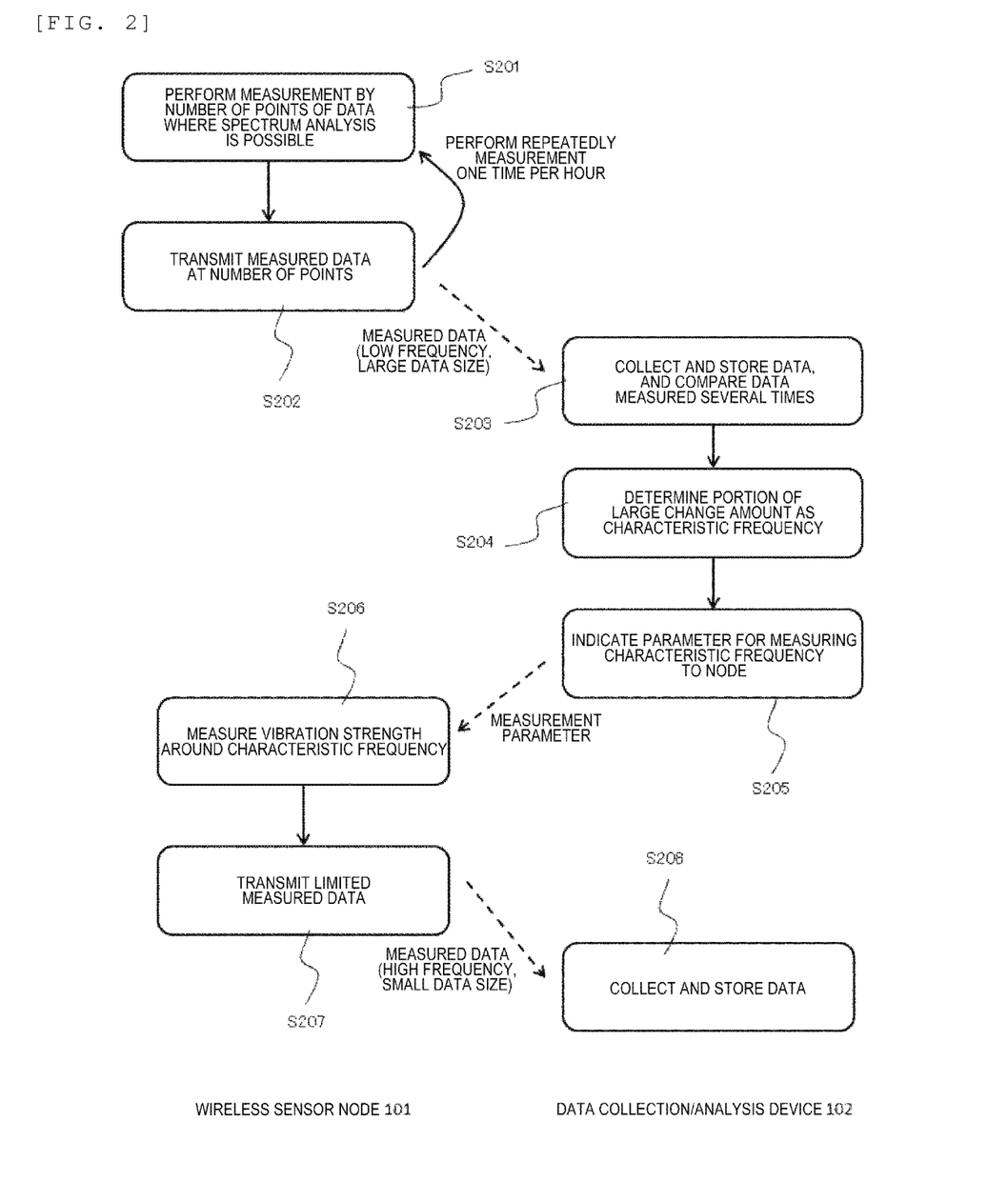
FIG. 2 is a flowchart for describing an exemplary flow of processing a sensor signal.

FIG. 2 is a diagram illustrating an operation flow of the sensing system of the embodiment of FIG. 1. The operations of the wireless sensor node 101 and the data collection/analysis device 102 will be described in sequence.

In an initial state (initial mode), the wireless sensor node 101 acquires a number of points in one measurement using a measurement parameter which allows a vibration spectrum analysis (S201). The measured data is accumulated in the memory of the CPU 8 and transmitted (S202). In the measurement in the initial state, the number of samples is large, and a data size is large. In the measurement and the transmission, the data of a number of points is transmitted at an average power consumption which is realizable in the independent power system 1. Therefore, there is a need to suppress a measuring frequency. For example, the measurement is performed at a frequency of about one time per hour.

Next, the data collection/analysis device 102 receives the measured vibration data. The data collection/analysis device 102 repeatedly receives the data at multiple times as needed. The received data is stored in the memory device as needed. Then, differences of the vibration data received at multiple times are compared and analyzed (S203). A frequency range containing a feature amount is determined based on the analysis result (S204). The analysis and the determination may be automatically performed by a predetermined software program, or may be reviewed by an operator. The reviewing and analysis result of the operator is input from the input device of the data collection/analysis device 102 and stored in the memory device.

Then, a measurement command containing the measurement parameter is transmitted from the data collection/analysis device 102 to the wireless sensor node 101 to measure amplitude of the vibration of the frequency range where the feature amount is contained (S205).

The wireless sensor node 101 performs a measurement focusing on the vibration amplitude of the frequency range containing the feature amount among the vibration data according to the command from the data collection/analysis device 102 (S206). In other words, the number of samples may be smaller than the measurement of the initial state, and the data size may be small. With this configuration, the data limited compared to the initial state is sent at one time in the measurement and the transmission. Therefore, it is possible to perform the measurement at a relatively high frequency even in view of an average power consumption which is realizable in the independent power system 1. For example, the measurement is performed at a frequency of one time per minute (S207).

Finally, in a steady state (steady mode), the data collection/analysis device 102 can collect the vibration amplitude data of the frequency range containing the feature amount at a high frequency of one time per minute. In other words, only meaningful data can be collected at a high frequency compared to a case when the vibration spectrum is collected in the initial state (S208).

<3. Data Analysis Principle>

Figure 3A:
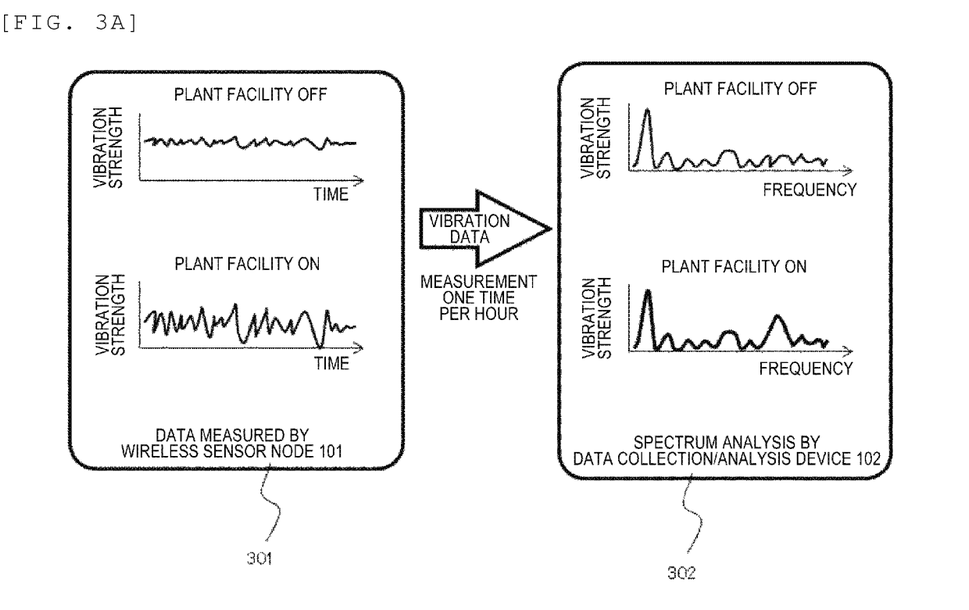
FIG. 3A is a schematic diagram for describing a specific example of sensor signal processing.

FIG. 3A is a schematic diagram for specifically describing an operation of the sensing system in a case where an operating state of a plant facility such as a pump and a cutting processing device is acquired from the vibration sensor.

In the example, the wireless sensor node 101 is mounted to the plant facility to measure a vibration. In addition, the data collection/analysis device 102 can turn on or off the power of the plant facility of a measurement target when a signal from the wireless sensor node 101 is received, or may separately acquire the information. Measured data 301 which is measured by the wireless sensor node 101 of FIG. 3 and transmitted contains data at the time of turning off the facility and data at the time of turning on the facility.

As described in FIG. 3, in the initial state (S201 to S202), the wireless sensor node 101 is measured based on the measurement parameter on which the vibration spectrum analysis is possible. In other words, the bandpass filter circuit 4, the amplitude detection circuit 5, and the integral circuit 6 are set to output the input signals themselves by the control from the CPU 8. The output of the vibration sensor 2 is converted into a digital value by the analog-digital conversion circuit 7. The converted value is transmitted as the measured data 301 in a wireless manner.

Since the vibration contains various frequency components, there are needed about 1,024 to 16,384 points as measurement points for sufficiently performing the analysis. In this example, the analog-digital conversion circuit 7 takes 16,384 points of samples at a sampling frequency of 1 MHz, and transmits the samples in a wireless manner. The measurement is necessarily performed with power consumption which is operatable in the independent power system 1 used by the wireless sensor node 101. However, there is a need to intermittently perform the measurement in view of a case where usable energy in an independent power source is less or a case where a long term operation is necessary using a battery. When a data size to be wirelessly transmitted is large, the power consumption is normally increased. Therefore, the measurement operation is necessarily performed from a frequency of one time per hour to a low frequency of one time per 24 hours. In the example, the measurement and the transmission are performed one time per hour.

The measured data 301 thus acquired is received and analyzed by the data collection/analysis device 102. In the example, the received vibration data is subjected to an FFT (Fast Fourier Transform) process to be converted to a frequency spectrum 302, and compared with a plurality of pieces of vibration spectrum data together with a signal indicating whether the power source of the plant facility of the measurement target is in ON state or OFF state.

Figure 3B:
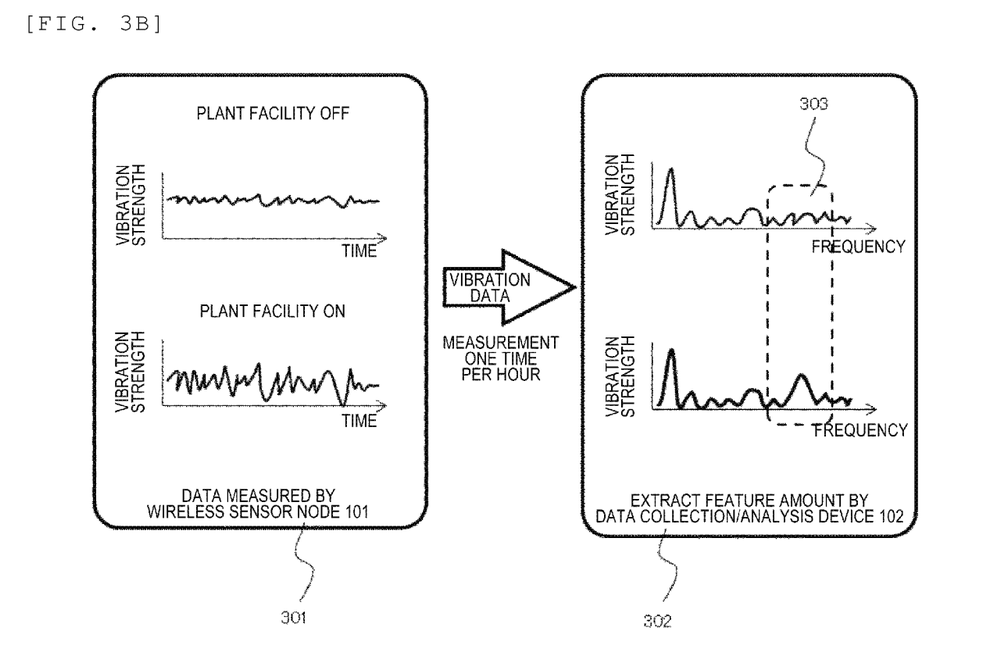
FIG. 3B is a schematic diagram for describing a specific example of sensor signal processing.

FIG. 3B illustrates a concept that the vibration spectrum data acquired in an ON state and the vibration spectrum data acquired in an OFF state are compared. In FIG. 3B, only two pieces of data are illustrated, but actually it is desirable that each piece of data be analyzed based on the data acquired several times. Then, as a result obtained by analyzing a difference between the respective vibration spectrums of the ON state and the OFF state, there is specified a characteristic frequency component 303 which strongly vibrates only when the device is in the ON state.

Figure 3C:
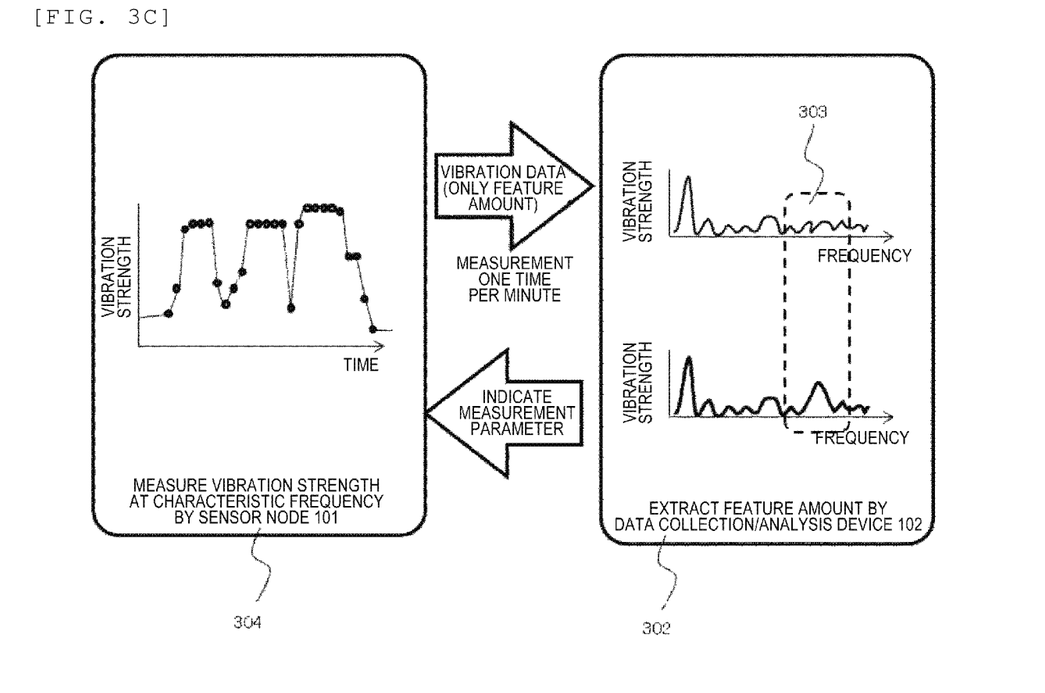
FIG. 3C is a schematic diagram for describing a specific example of sensor signal processing.

FIG. 3C illustrates a concept that a measurement parameter for amplitude strength of the characteristic frequency component 303 which is extracted by the data collection/analysis device 102 is designated to the wireless sensor node 101. In other words, the bandpass filter circuit 4 is set to pass through the band containing the characteristic frequency component by the control from the CPU 8. The output is converted into a digital value by the analog-digital conversion circuit 7 through the amplitude detection circuit 5 and the integral circuit 6. The converted value is set to be transmitted in a wireless manner. As a result, the measurement circuit unit 3 measures only measured data 304 of the vibration amplitude of the characteristic frequency, and transmits only one piece of data, so that the energy consumption is extremely reduced. Even using the independent power system 1, it is possible to transmit the data at a measurement frequency of one time per minute for example. In other words, the measurement can be made with a low power compared to the data containing a number of spectrums, so that it is possible to acquire the data at a high frequency.

The measured data 304 thus obtained is the amplitude strength of the characteristic frequency on which an operating state of the device is reflected. A detail change can be acquired compared to the initial state where the vibration spectrum is necessarily acquired. The data size can be reduced. Therefore, it is possible to efficiently collect data to be used for confirming a detail operation situation and a portent diagnosis of the plant facility.

<4. Details of System Operation>

The operation of the system will be specifically described again with reference to FIG. 1. As described above, in the initial state (S201 to S202), the data itself collected by the vibration sensor 2 is converted into a digital signal by an analog-digital converter without operating the bandpass filter circuit 4, the amplitude detection circuit 5, and the integral circuit 6, and is transmitted to the data collection/analysis device 102 as the measured data 301. Since the size of the measured data 301 is large (for example, 16,384 points) and the power consumption for measuring and transmitting is large, the frequency for measuring and transmitting is less (for example, one time per hour).

The data collection/analysis device 102 determines a characteristic frequency to be measured by the analysis of the measured data 301, and sends the characteristic frequency to the wireless sensor node 101 as the measurement parameter (S203 to S205). The measurement parameter is, for example, a command to the CPU 8. The CPU 8 sets the operation of a circuit such as the bandpass filter circuit 4 according to the command. In a case where the wireless sensor node 101 is provided with the amplitude detection circuit 5 and the integral circuit 6, the measurement parameter is sent to the wireless sensor node 101 together with an operate necessity and operation conditions (for example, filter frequency and integral period) of these circuits added or included.

The wireless sensor node 101 sets the operations of the respective circuits according to the received measurement parameter. In the steady state (S206 to S207), the bandpass filter circuit 4 is operated to extract the characteristic frequency. In general, the characteristic frequency is lower than a maximum frequency in the system, so that the size of the measured data 304 can be made small (for example, 2,048 points). The measured data 304 is transmitted to the data collection/analysis device 102 as a digital signal by the analog-digital conversion circuit 7. In the steady state, the power consumption for measurement and transmission is small, so that the frequency for measuring and transmitting can be increased (for example, one time per minute). At this time, the output of the vibration sensor 2 can also be limited according to the characteristic frequency.

In a specific configuration, the measured data 304 itself is digitized and transmitted, but the amplitude detection circuit 5 and the integral circuit 6 may be added. Since the vibration appears as a temporary physical phenomenon, the vibration may be not caught up depending on timing of the sampling when being detected by the vibration sensor 2. Therefore, after the characteristic frequency is detected, a value obtained by integrating the amplitude of the frequency range for a certain period, so that the vibration contained in the period is detected with a high reproducibility. For this reason, the amplitude of the characteristic frequency is converted into a voltage value by the amplitude detection circuit 5, and the amplitude value is integrated by the integral circuit 6. With the integration process, a variation in the characteristic frequency can be levelized to an extent, and the data size can be compressed. The amplitude detection circuit 5 and the integral circuit 6 are normally controlled by a command from the CPU 8 based on the measurement parameter to operate at the same time in the steady state.

In addition, the command from the CPU 8 may contain a parameter to control the integral period based on the measurement parameter. On an assumption that a meaningful vibration is input in a pulse shape, in a case where a gap between pulse-shaped vibrations is long, the integral period may be set to long. In addition, in such a case where an SN ratio is degraded because of lots of noises, the integral period is desirably set to long. Such a setting is performed together with or in addition to the measurement parameter from the data collection/analysis device 102.

<5. Supplements>

In the explanation of FIG. 3, the characteristic frequency has been described as a single piece of data only to be transmitted to the data collection/analysis device 102. However, a plurality of characteristic frequencies may be extracted by the bandpass filter circuit 4. Alternatively, the frequency band may be limited.

In the embodiment, the example has been described such that the analysis is performed based on turning ON/OFF the facility to specify the characteristic frequency. Otherwise, the analysis is not limited particularly, but various comparison schemes may be employed such as normal condition and abnormal condition, cooled condition and heated condition, and new product condition and aged condition.

Further, the signal processing performed by controlling the bandpass filter circuit 4, the amplitude detection circuit 5, and the integral circuit 6 in the embodiment may be performed as digital signal processing partially or as a whole. In that case, there is a need to acquire a detail of the digitized vibration data and a corresponding amount. Therefore, there is a concern that a low power consumption with which the independent power system 1 is operatable is not achieved. It is desirably that the signal processing may be configured by an analog circuit.

As described above, in a case where the wireless sensor node is made to operate with power as low as the independent power source operates in the related art, only a short size of data is allowed to be transmitted to reduce a wireless communication volume, and the type of usable sensors such as temperature, humidity, and illuminance are limited to a physical quantity as much as data size of several bytes which can be measured at one time. Therefore, for example, the data size comes to be increased in a sensor which performs a number of times of measurement in a relatively short period of time such as the measurement of the vibration spectrum, and thus the sensor is not applicable. In the embodiment of the invention, there are provided the filter circuit which extracts only a specific frequency from the sensor and the analog signal from the sensor, the integral strength acquisition circuit which acquires strength of the signal output from the filter circuit by integrating the signal for a certain period of time, and the analog-digital conversion circuit which converts the output of the strength acquisition circuit into digital data. Further, the pass band of the filter circuit and the integral period of the integral strength acquisition circuit are variable to values designated from the outside of the wireless sensor node.

With such a configuration of the embodiment, acquiring a sensor signal as a value obtained by integrating a signal intensity of a certain frequency range can be realized by adding a little power, and it is possible to reduce power required for a sensor measurement at the wireless sensor node and the data size required for the wireless communication. As a result, it is possible to reduce power consumption at the wireless sensor node in a case where a sensor is used to perform a number of times of measurement in a relatively short period of time such as the measurement of the vibration spectrum. The problem in the related art can be solved.

The invention is not limited to the above embodiments, and various modifications can be made. For example, some configurations of a certain embodiment may be replaced with the configurations of another embodiment, and the configuration of the other embodiment may also be added to the configuration of a certain embodiment. In addition, additions, omissions, and substitutions may be made on some configurations of each embodiment using the configurations of another embodiment.

INDUSTRIAL APPLICABILITY

The invention can use to a sensor network system and the like.

REFERENCE SIGNS LIST

101: wireless sensor node
102: data collection/analysis device
1: independent power system
2: vibration sensor
3: measurement circuit unit
4: bandpass filter circuit
5: amplitude detection circuit
6: integral circuit
7: analog-digital conversion circuit
8: CPU
9: wireless communication circuit

The invention claimed is:

1. A wireless sensor node, comprising:
a sensor which converts a physical quantity of vibration into a plurality of electric signals to measure the physical quantity of the vibration:
a filter which extracts signals containing frequency data from the electric signals;
a transmitter which transmits data in a wireless manner based on the signals containing the frequency data extracted by the filter;
a receiver which receives a command transmitted from an outside in the wireless manner;
a processor which controls a characteristic frequency band to be extracted by the filter based on the command; and
an independent power system which supplies power to at least the transmitter,
wherein the processor:
in an initial state, passes all frequency bands without limiting to the characteristic frequency band to be extracted by the filter,
in a steady state, controls to limit to the characteristic frequency band to be extracted by the filter after receiving the command,
performs control such that a size of the data in one transmission by the transmitter in the steady state is smaller than a size of the data in one transmission in the initial state, and
performs control such that a transmission frequency of the transmitter in the steady state is higher than a transmission frequency in the initial state.

2. The wireless sensor node according to claim 1, further comprising:
wherein the independent power system is operated by energy harvesting or a battery.

3. The wireless sensor node according to claim 1, further comprising:
an amplitude detection circuit which receives an output of the filter;
an integral circuit which receives an output of the amplitude detection circuit; and
an analog-digital converter which converts an output of the integral circuit into a digital signal, wherein
the amplitude detection circuit and the integral circuit are controlled to operate based on the command.

4. The wireless sensor node according to claim 3, wherein the command includes information to set an integral period of the integral circuit.

5. The wireless sensor node according to claim 3, wherein the amplitude detection circuit and the integral circuit are controlled to operate only in the steady state based on the command.

6. A wireless sensor system, comprising:
a wireless sensor node; and
a data collection/analysis device, wherein
the wireless sensor node comprises:
a sensor which converts a physical quantity of vibration into a plurality of electric signals to measure the physical quantity of the vibration;
a filter which extracts signals containing frequency data from the electric signals,
a transmitter which transmits data to the data collection/analysis device in a wireless manner based on the signals containing the frequency data extracted by the filter,
a receiver which receives a command transmitted from the data collection/analysis device in the wireless manner,
a processor which controls a characteristic frequency band to be extracted by the filter based on the command, and
an independent power system which supplies power to at least the transmitter, and
wherein the processor:
in an initial state, passes all frequency bands without limiting to the characteristic frequency band to be extracted by the filter,
in a steady state, controls to limit to the characteristic frequency band to be extracted by the filter after receiving the command,
performs control such that a size of the data in one transmission by the transmitter in the steady state is smaller than a size of the data in one transmission in the initial state, and
performs control such that a transmission frequency of the transmitter in the steady state is higher than a transmission frequency in the initial state.

7. The wireless sensor system according to claim 6, wherein the independent power system is operated by energy harvesting or a battery.

8. The wireless sensor system according to claim 6, further comprising:
an amplitude detection circuit which receives an output of the filter;
an integral circuit which receives an output of the amplitude detection circuit; and
an analog-digital converter which converts an output of the integral circuit into a digital signal, wherein
the amplitude detection circuit and the integral circuit are controlled to operate based on the command.

9. The wireless sensor system according to claim 8, wherein
the command includes information to set an integral period of the integral circuit.

10. The wireless sensor system according to claim 8, wherein the amplitude detection circuit and the integral circuit are controlled to operate only in the steady state based on the command.

11. A sensor data collecting method in a wireless sensor system which includes a wireless sensor node and a data collection/analysis device,
the wireless sensor node including;
a sensor which converts a physical quantity of vibration into a plurality of electric signals to measure the physical quantity of the vibration,
a filter which extracts signals containing frequency data from the electric signals,
a transmitter which transmits data to the data collection/analysis device in a wireless manner based the signals containing the frequency data extracted by the filter,
a receiver which receives a command transmitted from the data collection/analysis device in the wireless manner,
a processor which controls a characteristic frequency band to be extracted by the filter based on the command, and
an independent power system which supplies power to at least the transmitter,
the wireless sensor node, in an initial mode, performing steps of:
transmitting the data in the wireless manner based on first signals containing all frequency bands to the data collection/analysis device without filtering the electric signals obtained by the sensor using the filter,
receiving the command which is transmitted from the data collection/analysis device in the wireless manner, and
moving to a steady mode by controlling to the characteristic frequency band to be extracted by the filter based on the command, and
the wireless sensor node, in the steady mode, performing step of:
transmitting the data in the wireless manner based on second signals within the characteristic frequency band by filtering the electric signals obtained by the sensor using the filter to the data collection/analysis device,
wherein a wireless transmission frequency of said transmitting the data of the wireless sensor node in the initial mode is lower than a wireless transmission frequency of said transmitting the data of the wireless sensor node in the steady mode.

* * * * *